Feb. 8, 1944. H. E. JENSEN 2,341,382
EXPLOSION-PROOF BATTERY
Filed Nov. 4, 1939 2 Sheets-Sheet 1

Inventor
Henry E. Jensen
by his Attorneys
Howson & Howson

Feb. 8, 1944. H. E. JENSEN 2,341,382
EXPLOSION-PROOF BATTERY
Filed Nov. 4, 1939 2 Sheets-Sheet 2
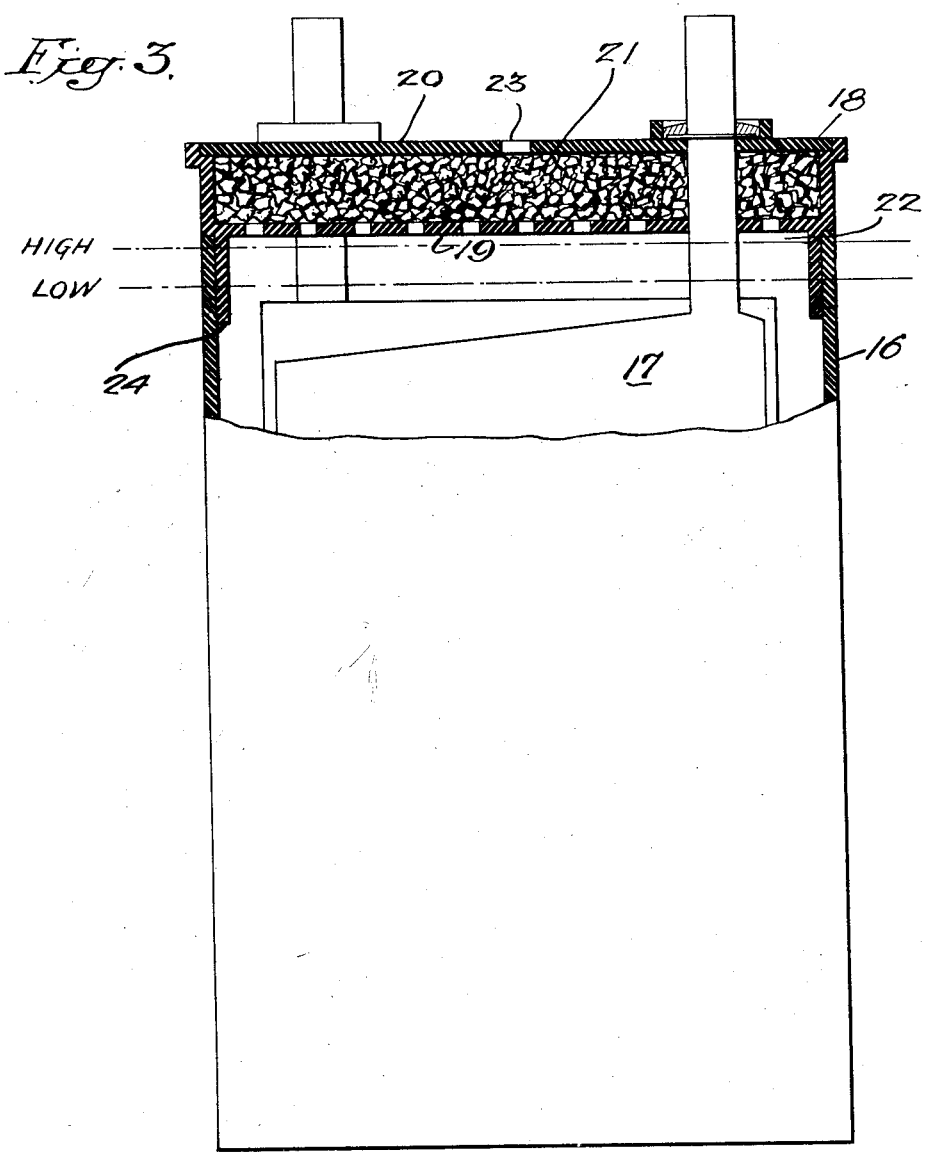
Inventor:
Henry E. Jensen
by his Attorneys
Howson & Howson Patented Feb. 8, 1944

2,341,382

UNITED STATES PATENT OFFICE 2,341,382

EXPLOSION-PROOF BATTERY

Henry E. Jensen, Camden, N. J., assignor to Philco Corporation, a corporation of Pennsylvania Application November 4, 1939, Serial No. 302,933

7 Claims. (Cl. 136—179)

This invention relates to storage batteries, and more particularly to storage batteries of the lead acid type, wherein the products of the chemical reactions during the charging or discharging of the battery cells include a mixture of gases which are potentially combustible or explosive. For example, common batteries of this type yield a mixture of hydrogen and oxygen, particularly toward the end of the charging cycle.

It is well known that these potentially explosive gases may be ignited by sparks or other static discharges which may occur, particularly during the filling or testing of a cell, in spite of all reasonable precautions. In the case of large batteries especially, the chamber provided to permit the rise and fall of the electrolyte level may contain a sufficient quantity of mixed gases to crack or break the cell container if these gases are ignited. This destruction of the cell, and the consequent acid spray and spilling, not only involves costly damage, but also constitutes a serious hazard to the physical being of attendants or other persons.

Heretofore, various proposals have been directed toward prevention of explosions in batteries of this type.

According to the present invention, however, an adequate solution of the problem is attained, not by seeking to prevent entirely the explosion of gases, but by effectively controlling the explosion in a manner to prevent any deleterious effects therefrom. This result is achieved by effectively dividing the gas chamber above the electrodes and electrolyte into multitudinous irregular and interconnected gas pockets, cells or cavities which permit a series of small inconsequential explosions, but prevent the occurrence of any damaging or hazardous explosion.

The principal object of the invention, therefore, is to provide a novel battery structure of this type.

A more specific object of the invention is to provide novel means for controlling any explosion in a battery of this type, such means comprising a mass of pervious material forming small passages or gas pockets through which the liberated potentially explosive gases may flow. Other objects and features of the invention will appear hereinafter.

In the accompanying drawings:

Fig. 3 is a similar view of a modification.

Figure 2:
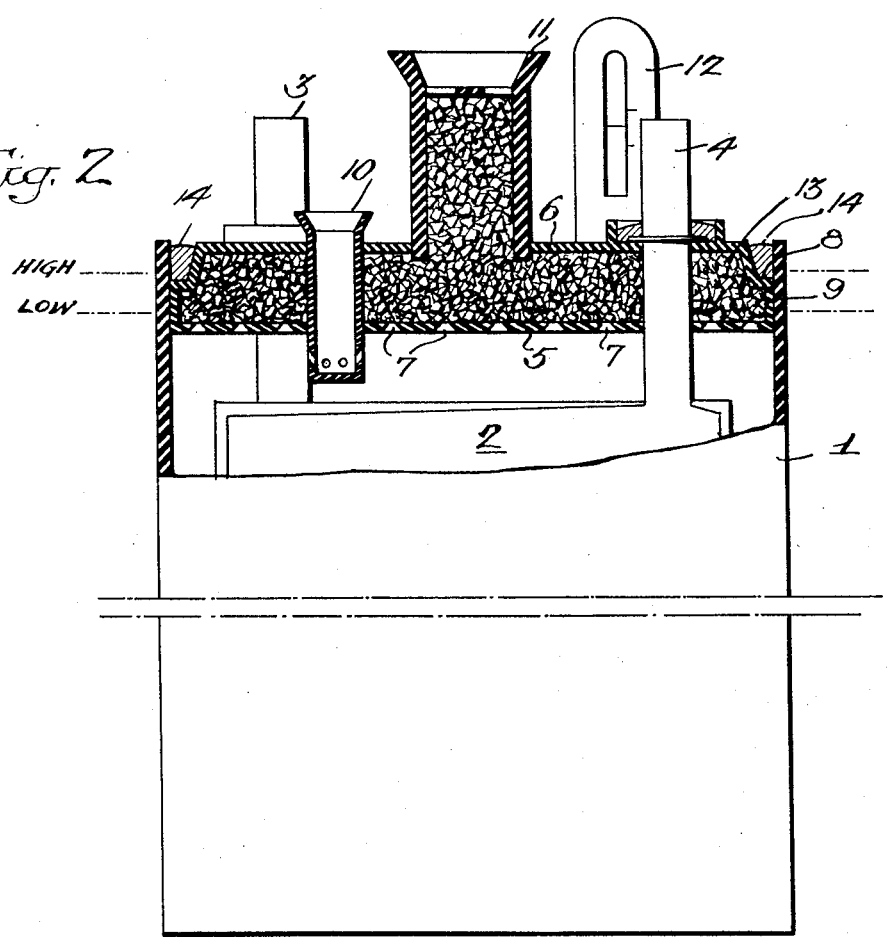
Fig. 2 is a part elevation and part sectional view of the cell, with the sectional part taken along line 2—2 of Fig. 1.
Figure 1:
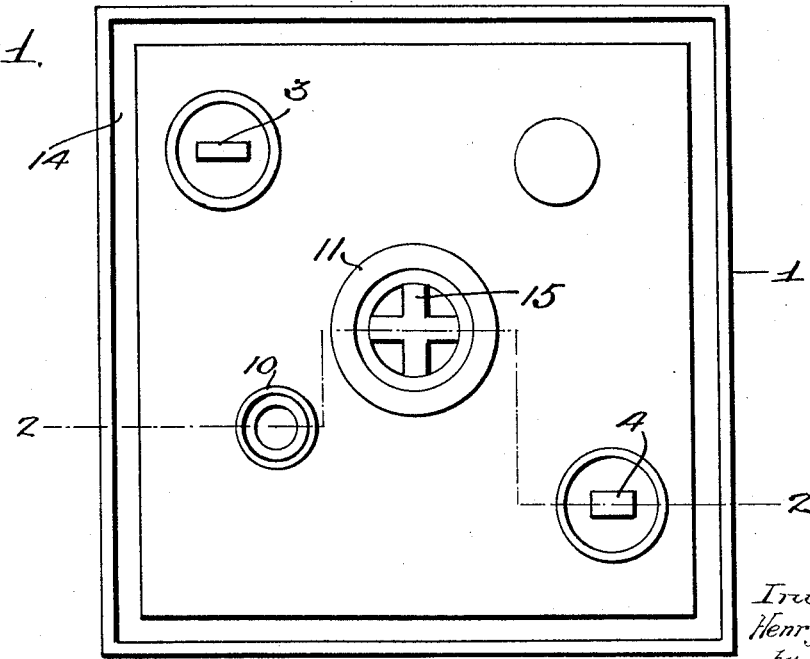
Fig. 1 is a horizontal plan view of a battery cell embodying the invention.

Referring first to Figs. 1 and 2, 1 represents the cell container which may be of hard rubber, glass or other suitable material. The plate elements and separators are indicated generally at 2 and may be immersed in a suitable electrolyte and supported by suitable mechanical means not shown. These plate elements may also be connected by suitable straps terminating in upwardly extending terminal posts 3 and 4. All of the above described construction may be of conventional design, according to present battery practice. The battery is of the lead-acid type and the electrodes and electrolyte are of a character such that potentially explosive gases are liberated during electrolytic action of the battery.

The top or cover assembly of this cell is of novel construction, in accordance with the present invention, and may comprise two molded plate like sections of hard rubber 5 and 6 arranged in parallel, spaced relation to form a chamber therebetween. The lower section 5 is adapted to fit against the sides of the container and is perforated as shown at 7. The upper section 6 has a peripheral flange 8 which rests upon and is secured to peripheral wall 9 of section 5. The hollow cover assembly thus formed is provided with openings to receive the terminal posts, a filling tube 10, a vent tube 11, and a level indicator 12, as will be described in greater detail later. Within the hollow cover structure is a pervious filling material 13 which divides the chamber into numerous small interconnected gas pockets, passages or spaces, thus preventing the occurrence of any potent explosion within the chamber, as will be described in further detail hereinafter.

The cover assembly above described may be sealed into the container in any suitable manner as by a sealing compound 14, the battery post openings also being properly sealed. The vent tube 11 may be molded separately and fitted onto the cover section 6. This tube is preferably removable and should include a coarse molded grid 15. The filling tube 10 may be of any type properly secured in position, while the electrolyte level indicator 12 is of well known design.

While any suitable filler material 13 may be employed, it is preferred to use loosely packed material such as stone, glass, crushed silica, or the like. This material should preferably be formed in small pieces of irregular configuration or shape. For example, glass crystals occupying approximately one-half of the normal volume of the chamber have been found satisfactory. Such crystals may be formed easily and economically by pouring molten glass culotte into a water tank, thus forming large crystals, and then shattering these crystals by a suitable tumbling operation. In one instance, glass crystals capable of passing through a half-inch screen, but incapable of passing through a three-eighths inch screen were employed successfully in a chamber whose dimensions were 16 x 16 x 5 inches and whose elements were of hard rubber. While this size of the pieces is considered preferable, it may be varied at will by as much as one-fourth of an inch if desired. If a glass container is used, the pieces should be slightly smaller, since glass is less resistant to shock than hard rubber and the smaller pieces provide smaller interconnected gas pockets, spaces or cavities. It is preferable that the pieces of material should not have smooth or uniform surfaces, but should be irregular and such as to break up the space between the plates 5 and 6 into numerous irregular, interconnected gas pockets, cells or cavities. However, the invention contemplates the use of pieces of any suitable shape or size. In order to prevent the settling of the filler material 13 away from the upper plate 6, the under side of this plate may be covered with a compound and a layer of filler material may be secured to the cover by means of the compound.

Since weight is sometimes an important factor, the choice of filler material may be governed accordingly. For example, sintered diatomaceous earths may be used, and such material is characterized by light weight and high absorbency.

In general, the filler material should occupy approximately one-half the volume of the chamber and it should provide interconnected gas pockets, passages or spaces large enough substantially to prevent capillary action (which would tend to close the spaces with electrolyte) and yet small enough to prevent accumulation in any one space or area of sufficient potentially explosive gas to permit a potent explosion. Materials other than those above mentioned, such as coarse glass wool or the like, may be employed, keeping in mind the above considerations and governing the use of the material accordingly.

In the operation of the cell, the electrolyte is maintained between the high and low levels, as indicated in Fig. 2. Since the cell herein shown and described is of the lead-acid type, the electrolyte is usually sulphuric acid and the electrodes are of the usual lead-containing type. Hence, during the electrolytic action of the cell, oxygen and hydrogen are given off from the plates and bubbles of potentially explosive gas will rise through the electrolyte and through the perforations 7 into the cellular spaces or interstices formed by the filler 13 and will then pass to the atmosphere through the vent tube 11. The electrolyte level is always maintained above the lower section 5 so that no undivided gas chamber of any appreciable volume is present within the cell as in conventional constructions. Instead, the gas chamber is in reality a maze of small interconnected gas pockets defined by the filler material 13, and the common openings or passages between pockets will have relatively small areas. In the event that a spark occurs in the neighborhood of the vent tube, the hydrogen and oxygen present therein will be ignited, but the quantity of gases and the intensity of the resulting explosion will not be sufficient to cause any noticeable effect on the cell. However, the gases within the successive interconnected gas pockets in the gas chamber will be individually ignited and the combustion of the gases will occur consecutively as the explosions spread, and a relatively slow series of small explosions in this gas mixture will occur throughout the gas chamber as the disturbance spreads from its point of origin. Thus, the breaking up of the gas chamber by the material 13 does not permit an instantaneous burning of any considerable amount of gas. Instead, the gases within the small individual interconnected gas pockets burn in succession. Therefore, instead of the combustible gases generating an explosion of considerable violence, a weak prolonged series of small explosions occur. In this case the pressures created within the cell never reach such strength as to cause damage to any of the elements of the cell or the spraying of any acid therefrom, for the vent tube 11 serves as an ample outlet for the low pressure gases thus generated. Further, the loose pieces of the filler material will tend to absorb rather than transmit the shock of the individual explosions.

It has been found by tests that when the gases are ignited, an interval of several minutes must elapse before the cell again contains sufficient potentially explosive gas to ignite. This feature insures that a continuous flame cannot be sustained by the gases in the cell.

In addition to the foregoing major advantages, the cell described above has been found to give materially less acid spray than even the best of conventional constructions, particularly during charging. This feature is, obviously, highly desirable in general, but is of primary importance when the batteries are used with exposed electrical wiring and switches, as in telephone substation installations. The natural elimination of acid spray by the cover assembly also results in an appreciable decrease in the electrolyte evaporation rate, as will be readily understood.

In Fig. 3 there is illustrated the application of this invention to a conventional or standard battery cell of the lead-acid type. By means of the structure shown and now to be described, the top or cover of the conventional battery cell may be replaced by a top structure constructed according to the present invention, and in this manner the conventional battery cell may be rendered substantially explosion-proof.

Referring to Fig. 3, there is shown the conventional cell container 16 having the usual lead-containing plates 17 therein and containing the usual sulphuric acid electrolyte whose level varies between the levels indicated.

In accordance with this form of the present invention, there is provided a top or cover assembly 18 which is adapted to replace the conventional top or cover of the cell. The top structure 18 is similar to that above described and comprises a lower plate 19 and an upper plate 20 between which there is disposed the filling material 21. In this instance, however, the top structure, instead of being fitted down into the cell so as to extend below the level of the electrolyte, is seated upon the upper edges of the container 16, as clearly illustrated. This is necessitated by the plate strap construction employed in conventional battery cells which will not permit the top structure to extend below the level of the electrolyte. Consequently, there is a space 22 between the electrolyte and the lower cover plate 19, and the gases in this space may explode, but it has been found that the cover structure reduces the shock of any such explosion to such an extent that the explosion is inconsequential. It will be understood that if the cell construction permits, the plate 19 may be recessed into the cell.

The lower cover plate 19 is provided with apertures as before, and permits the ready passage of gases upward into the numerous small interconnected gas pockets, spaces or interstices formed by the filling material 21. If the upper cover plate 20 is provided with a single vent opening, as shown at 23, there is a tendency to retard the escape of gases; and to compensate for this, there is provided a ring 24 extending downward from the plate 19 adjacent the inner walls of the container 16. This ring may be formed of molded hard rubber or any other suitable material. The purpose of this ring is to reinforce the container 1 in the region of greatest shock.

If desired, however, the upper plate 20 may be provided with a plurality of vent openings corresponding substantially to the openings in the lower plate 19. In such case, the escape of the gases is not unduly restricted, and the reinforcing ring 24 may be dispensed with.

In the operation of this device, the cover structure serves to prevent the occurrence of any violent explosion, as in the previously described device, and it also serves to minimize any explosion which may take place in the space 22. Consequently, this construction provides a practical means for converting a conventional battery cell into one embodying the features and advantages of the present invention.

While the invention has been described with reference to certain specific embodiments, it will be apparent that it is capable of further modification, particularly as to design or specific details of construction.

I claim:

1. In a storage battery of the lead-acid type, a container including a top having a vent therein, electrodes within said container, a sulphuric acid electrolyte in said container maintained at a level below the top thereof to provide a space between said electrolyte and said top, said electrodes and electrolyte being of a character such that potentially explosive gases are liberated into said space during electrolytic action of the battery, and means for controlling explosion of said gases upon ignition thereof comprising an assembly of small solids occupying a substantial portion of said space and dividing said portion into a plurality of small interconnected gas pockets of a size such that ignition of the gases within said portion will result in a plurality of small explosions in said interconnected gas pockets of an intensity insufficient to cause destruction of said battery.

2. In a storage battery, a container including a top having a vent therein, electrodes within said container, an electrolyte in said container maintained at a level below the top thereof to provide a space between said electrolyte and said top, said electrodes and electrolyte being of a character such that hydrogen and oxygen are liberated into said space during electrolytic action of the battery, and means for controlling explosion of said hydrogen and oxygen upon ignition thereof comprising an assembly of small solids occupying a substantial portion of said space and dividing said portion into a plurality of small interconnected gas pockets of a size such that ignition of said hydrogen and oxygen within said portion will result in a plurality of small explosions in said interconnected gas pockets of an intensity insufficient to cause destruction of said battery.

3. In a storage battery, a container including a top having a vent therein, electrodes within said container, a sulphuric acid electrolyte in said container maintained at a level below the top thereof to provide a space between said electrolyte and said top, said electrodes being of a character such that electrolytic action between said electrodes and the sulphuric acid electrolyte will liberate hydrogen and oxygen into said space, and means for controlling explosion of said hydrogen and oxygen upon ignition thereof comprising an assembly of small solids occupying a substantial portion of said space and dividing said portion into a plurality of small interconnected gas pockets of the size such that ignition of said hydrogen and oxygen within said portion will result in a plurality of small explosions in said interconnected gas pockets of an intensity insufficient to cause destruction of said battery.

4. In a storage battery, a container including a top having a vent therein, lead-containing electrodes within said container, a sulphuric acid electrolyte in said container maintained at a level below the top thereof to provide a space between said electrolyte and said top, electrolytic action between said lead-containing electrodes and sulphuric acid electrolyte liberating hydrogen and oxygen into said space during electrolytic action of said battery, and means for controlling explosion of said hydrogen and oxygen upon ignition thereof comprising an assembly of small solids occupying a substantial portion of said space and dividing said portion into a plurality of small interconnected gas pockets of a size such that ignition of said hydrogen and oxygen within said portion will result in a plurality of small explosions in the said interconnected gas pockets of an intensity insufficient to cause destruction of said battery.

5. A battery as defined in claim 1 and in which the small solids are irregularly spaced to form the small interconnected gas pockets between said solids.

6. A battery as defined in claim 1 in which a perforated plate is positioned below the top of the container to support thereon the assembly of small solids.

7. In a storage battery of the lead-acid type, a container having an open top, electrodes within said container and below said open top, an electrolyte in said container maintained at a level below said open top, said electrodes and electrolyte being of a character such that potentially explosive gases are liberated into the space above said electrolyte during electrolytic action of said battery, and means for controlling explosion of said gases upon ignition thereof comprising a gas accumulation container having spaced perforated top and bottom portions, said gas accumulation container being positioned across the top of said first-mentioned container and above the electrolyte contained therein, and an assembly of small solids substantially filling said gas accumulation container and dividing the same into a plurality of small interconnected gas pockets of a size such that ignition of the gases within said gas accumulation container will result in a plurality of small explosions in the interconnected gas pockets within said gas accumulation container and of an intensity insufficient to cause destruction of said battery.

HENRY E. JENSEN.